Nov. 9, 1943.   C. B. ASKE, JR   2,333,626
ORNAMENTAL WHEEL TRIM SECURING MEANS
Filed June 24, 1942   2 Sheets-Sheet 1

INVENTOR.
CHARLES B. ASKE JR.
BY Everett G. Wright
ATTORNEY

Nov. 9, 1943.  C. B. ASKE, JR  2,333,626
ORNAMENTAL WHEEL TRIM SECURING MEANS
Filed June 24, 1942   2 Sheets-Sheet 2
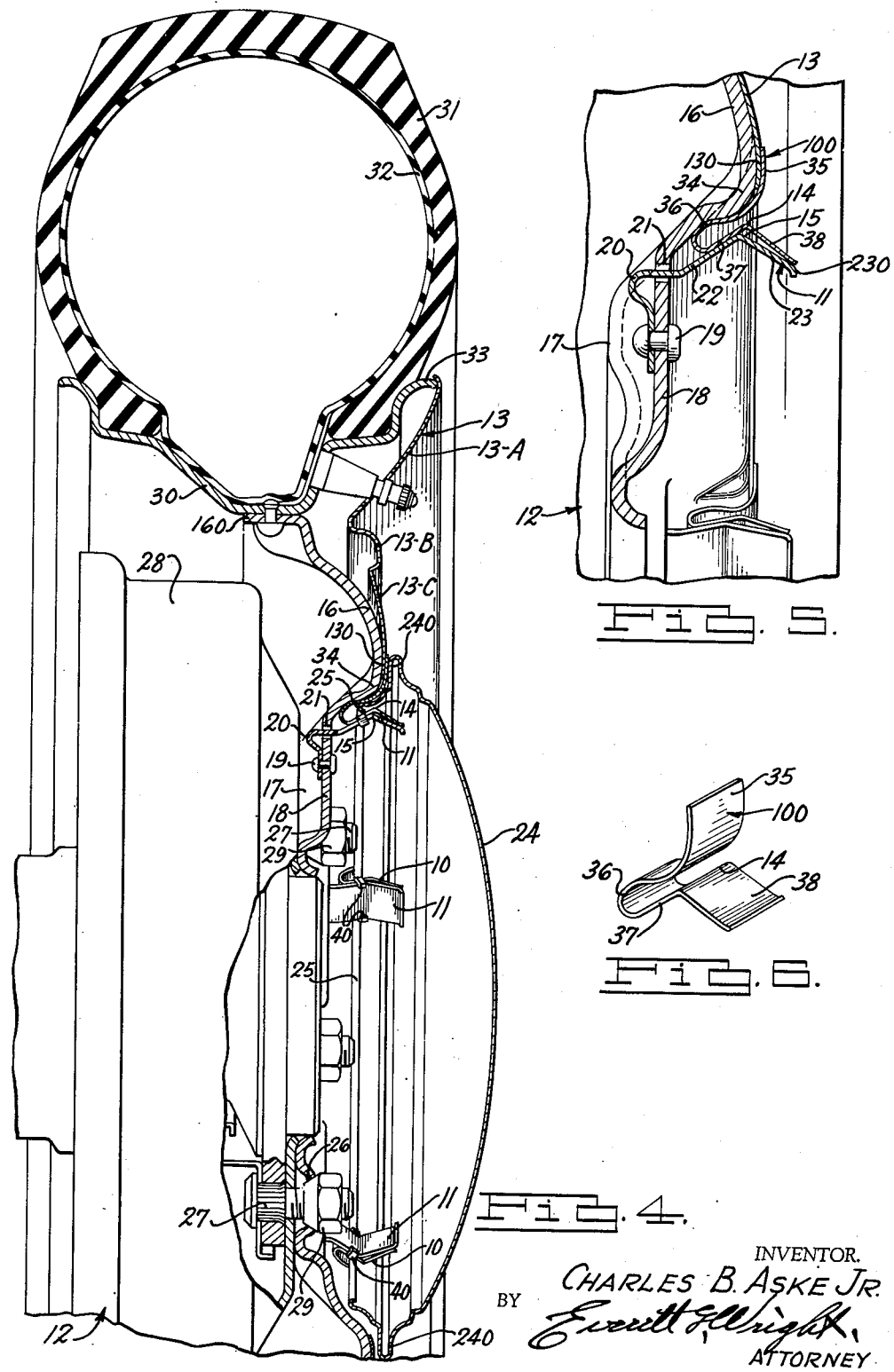
INVENTOR.
CHARLES B. ASKE JR.
BY
ATTORNEY Patented Nov. 9, 1943

2,333,626

UNITED STATES PATENT OFFICE 2,333,626

ORNAMENTAL WHEEL TRIM SECURING MEANS

Charles B. Aske, Jr., Detroit, Mich.

Application June 24, 1942, Serial No. 448,265

2 Claims. (Cl. 301—108)

This invention relates to and has for its primary object the providing of means for securing annular ornamental wheel trim to vehicle wheel assemblies independent of the hub cap and simultaneously re-locating the detent of the conventional hub cap securing elements carried by the vehicle wheels axially outward with respect thereto whereby to accommodate the vehicle wheel assembly to receive and secure ornamental wheel trim thereon with a minimum of expense and alteration and at the same time decrease the possibility of losing hub caps as a result of placing the inner periphery of the annular ornamental wheel trim under the outer peripheral lip of the hub cap or as the result of one or more of the hub cap securing elements becoming bent out of shape.

Other objects of the invention will become apparent by reference to the following detailed description taken in connection with the accompanying drawings, in which.

Fig. 4 is a fragmentary cross sectional view of a vehicle wheel, tire, hub cap, and annular ornamental wheel trim disc showing securing means embodying the invention applied to the hub cap retainer springs and fixing the said ornamental disc to the said wheel, the hub cap being shown disposed over the inner periphery of said ornamental wheel trim disc, over the said securing means, and retained by said securing means on said vehicle wheel.

Figure 1:
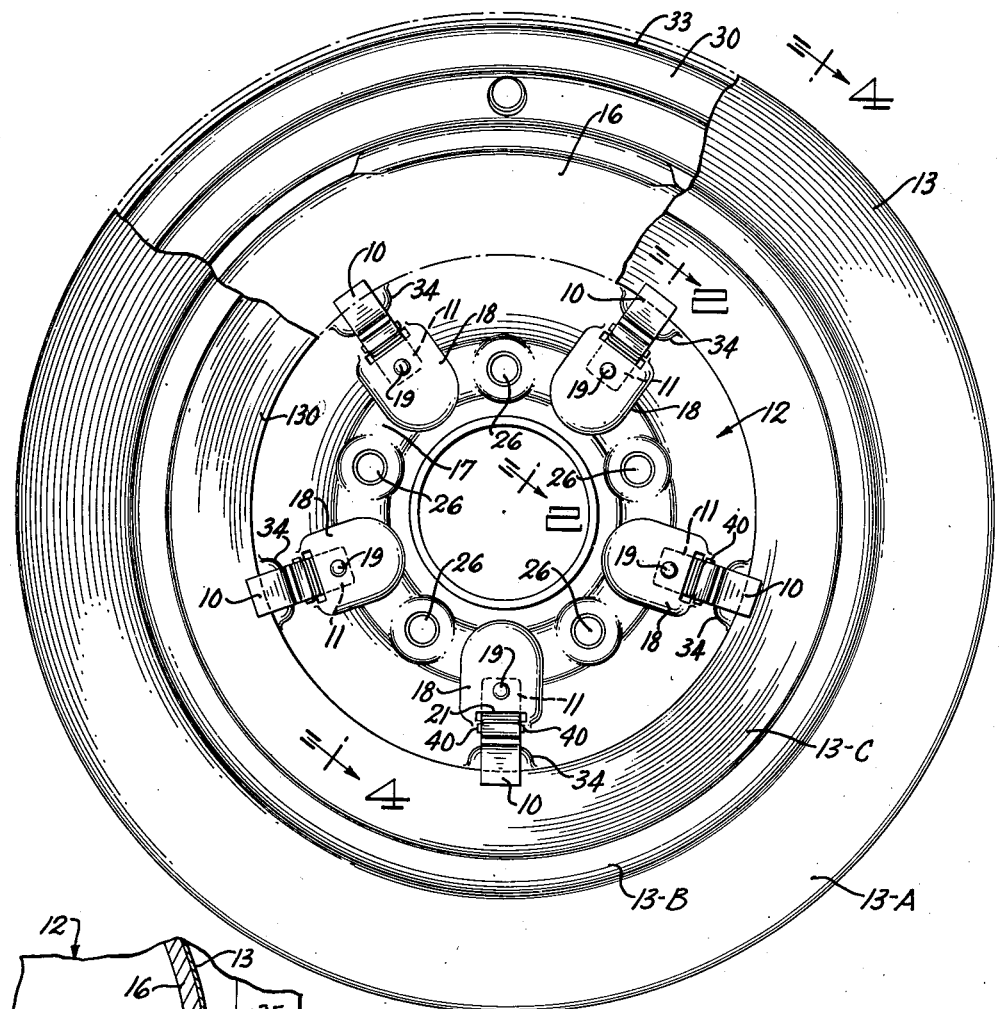
Fig. 1 is the slide elevational view of a vehicle wheel and an annular ornamental wheel trim disc showing the invention applied to the conventional hub cap retainer springs of the vehicle wheel and holding the said annular ornamental wheel trim disc in place on said wheel, a portion of the said annular ornamental wheel trim disc being broken away.
Figure 2:
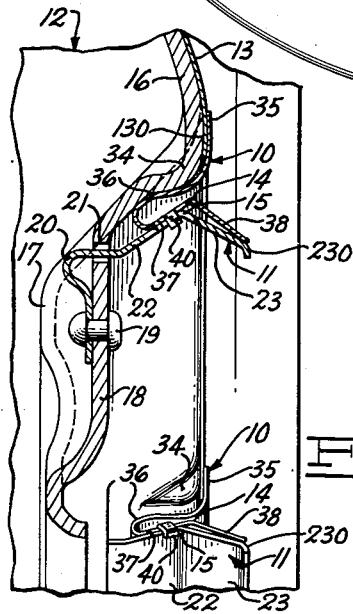
Fig. 2 is an enlarged fragmentary sectional view taken on the line 2—2 of Fig. 1.
Figure 3:
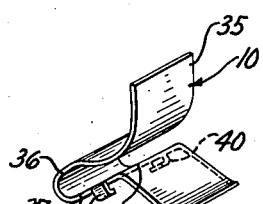
Fig. 3 is a view in perspective showing a preferred form of a spring clip embodying the invention.

Fig. 5 is an enlarged fragmentary sectional view similar to Fig. 2 showing an alternate embodiment of the invention wherein side lugs are omitted.

Fig. 6 is a view in perspective showing the alternate form of spring clip disclosed in Fig. 5.

Referring now to the drawings wherein like numerals refer to like and corresponding parts throughout the several views, the illustrative embodiment of the invention disclosed in Figs 1 to 4 inclusive comprises a spring clip 10 which is operatively positioned over each hub cap retainer spring 11 of a vehicle wheel assembly 12 in such a manner as to engage the inner periphery 130 of an annular ornamental wheel trim disc 13 positioned over the vehicle wheel 12 and secure the said ornamental wheel trim disc 13 to the said wheel 12 simultaneously with providing a new hub cap detent 14 axially and radially outward with respect to the hub cap detent 15 provided on the said hub cap retainer spring 11, all as hereinafter described in detail.

The wheel assembly 12 shown in the drawing with which to illustrate the invention comprises annular body portion 16 dished at 17 and formed with circumferentially spaced protuberances 18 to accommodate the riveting of the hub cap retainer springs 11 to the said wheel 12 by means of suitable rivets 19. Each hub cap retainer spring 11 is secured to the rear of the said wheel 12 by the said rivets 19 and is formed with a loop 20 at the rear of the wheel 12 to protude in an axially disposed direction through slotted apertures 21 provided in the said wheel 12 as best indicated in Fig. 2. Axially outward of the said wheel 12, the said hub cap retainer springs 11 are formed to extend first radially and diagonally outward at 22 and then radially and diagonally inward at 23 to provide radially outward facing the hub cap detents 14 over which the annular anchor rib 25 of the hub cap 24 ordinarily snaps when urged over the plurality of circumferentially spaced hub cap retainer springs 11 usually provided on the vehicle wheel 12, see Figs. 1, 2 and 4.

Circumferentially spaced between the hereinbefore mentioned protuberances 18 and retainer springs 11 are provided wheel stud apertures 26 which accommodate wheel studs 27 carried by the brake drum assembly 28. Nuts 29 threaded on the said wheel studs 27 secure the said wheel 12 to the brake drum assembly 26. The vehicle wheel 12 has a drop center rim 30 riveted to the peripheral flange 160 of the annular body portion 16 thereof, the said drop center rim having the usual tire 31 and inner tube 32 thereon.

The annular ornamental wheel trim disc 13 preferably extends from over the laterally extending flange 33 of the drop center rim 30 to under the outer peripheral lip 240 of the hub cap 24 as best illustrated in Fig. 4, the portion 13—A of the wheel trim 13 representing a radially and axially inward extension or continuation of the outer side wall of the tire 31, the portion 13—B thereof representing the rim of a wheel, and the portion 13—C between the rim representing portion 13—C and the outer peripheral lip 240 of the hub cap 24 representing a wheel.

The annular body portion 16 of the wheel 12 is preferably provided with a plurality of circumferentially spaced nibs 34 which are located radially opposite and outwardly from the hub cap retainer springs 11, which nibs 34 normally aid in guiding the annular anchor rib 25 of the hub cap 24 over the detent 14 of the hub cap retainer springs 11.

The spring metal wheel trim holding clips 10 are each preferably formed at their outer end 35 to fit over the inner periphery 130 of the annular ornamental wheel trim disc 13 and the contour of a nib 34 opposite a hub cap retainer spring 11, are looped at 36 to fill the re-entrant space between the nib 34 and the opposite hub cap retainer spring 11, and are extended at 37 along the radially and diagonally outwardly disposed portion 22 of the hub cap retainer spring 11 to provide a hub cap detent 14 radially and axially outward with respect to the hub cap detent 15 of the hub cap retainer spring 11, from which detent 14 the said wheel trim holding clip 10 has a portion 38 which preferably meets and rides the curved end 230 of the radially and inwardly disposed portion 23 of the hub cap retainer spring 11, all as best indicated in Fig. 2. The spring metal wheel trim holding clips 10 are each preferably provided with a pair of oppositely disposed tabs 40 located along the side 37 thereof so as to hook around the radially and diagonally outward disposed portion 22 of the hub cap retainer spring 11 at and radially inward of the detent 15 of the hub cap retainer spring 11 whereby to positively prevent the spring metal wheel trim holding clip 10 from being pulled off from the hub cap retainer spring 11 when the annular anchor rib 25 of the hub cap 24 is pulled over the detents 14 of the spring clip 10 when the hub cap 24 is being removed from the wheel assembly 12 after the said hub cap 24 has been secured to the wheel assembly 12 by snapping the annular anchor rib 25 thereof over the detents 14 of the spring clips 10.

In the alternate embodiment of the invention disclosed in Figs. 5 and 6, the spring clip 100 is precisely like the spring clip 10 with the exception that each spring clip 100 relies upon its loop 36 disposed in the re-entrant space between the nib 34 and the opposite hub cap retainer spring 11 to prevent the said spring clip 10 from being pulled away from the hub cap retainer spring 11 when the hub cap 24 is removed from the detents 14 of the said spring clips 100.

Thus, the spring clips 10 and 100 are employed to secure the annular ornamental wheel trim disc 13 to the vehicle wheel assembly 12 and at the same time provide new detents 14 to engage and hold the hub cap 24 in place on the wheel assembly 12, which new detents 14 are so located with respect to the old detents 15 of the hub cap retainer springs 11 as to compensate for the added thickness of the inner periphery 130 of the wheel trim disc 13 and the thickness of the spring clips 10 which are interposed between the annular body portion 16 of the vehicle wheel 12 and the outer peripheral lip 240 of the hub cap 24.

Although but two embodiments of the invention have been disclosed and described in detail, it is obvious that many changes may be made in the size, shape, arrangement and detail of the various elements of the invention without departing from the spirit of the invention as defined by the appended claims, it having been intended that the embodiments of the invention disclosed herein be construed in a descriptive rather than a limiting sense.

I claim:

1. Means for securing annular ornamental wheel trim discs and hub caps to vehicle wheels employing a multiplicity of circumferentially spaced axially extending radially resilient hub cap retainer springs each forming a radially outward facing hub cap detent, comprising a resilient holding clip engaged over each of said hub cap retainer springs, each said clip having a portion formed to engage the inner periphery of the said annular ornamental wheel trim disc and secure the same to said vehicle wheel and a portion positioned axially outward of the wheel relative to the corresponding detent, the said last-mentioned portions of said clips being formed to engage a hub cap and secure the same to the wheel.

2. Means for securing annular ornamental wheel trim discs and hub caps to vehicle wheels employing a multiplicity of circumferentially spaced axially extending radially resilient hub cap retainer springs each forming a radially outward facing hub cap detent, comprising a resilient holding clip engaged over each of said hub cap retainer springs and formed to engage the inner periphery of the said annular ornamental wheel trim disc and secure the same to said vehicle wheel, a portion of each of said resilient wheel trim holding clips being formed to provide a hub cap detent radially and axially outward from the hub cap detent provided by said hub cap retainer springs whereby to accommodate said clips to firmly engage a hub cap spaced axially from said wheel by the thickness of the said annular ornamental wheel trim and said wheel trim holding clips.

CHARLES B. ASKE, Jr.